(12) United States Patent
Beyer et al.

(10) Patent No.: US 9,061,753 B2
(45) Date of Patent: Jun. 23, 2015

(54) HINGED PANEL OPERATION SYSTEMS AND METHODS

(71) Applicant: The Boeing Company, Seal Beach, CA (US)

(72) Inventors: Kevin W. Beyer, Seattle, WA (US); Seiya Sakurai, Seattle, WA (US); Martin F. Stephenson, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 265 days.

(21) Appl. No.: 13/688,211

(22) Filed: Nov. 29, 2012

(65) Prior Publication Data

US 2014/0145039 A1    May 29, 2014

(51) Int. Cl.
*B64C 3/50* (2006.01)
*B64C 9/02* (2006.01)
*B64C 13/28* (2006.01)
*B64C 9/10* (2006.01)
*B64C 9/16* (2006.01)

(52) U.S. Cl.
CPC . *B64C 9/02* (2013.01); *B64C 13/28* (2013.01); *B64C 9/10* (2013.01); *Y02T 50/44* (2013.01); *B64C 9/16* (2013.01); *Y02T 50/32* (2013.01)

(58) Field of Classification Search
CPC .......... B64C 13/28; B64C 13/38; B64C 9/16; B64C 9/18; B64C 9/20
USPC ................. 244/99.2, 99.3, 215, 216
See application file for complete search history.

(56) References Cited

U.S. PATENT DOCUMENTS

| | | | | |
|---|---|---|---|---|
| 2,404,956 A * | 7/1946 | Gouge | | 244/216 |
| 3,112,089 A * | 11/1963 | Silvius | | 244/216 |
| 3,874,617 A * | 4/1975 | Johnson | | 244/216 |
| 3,917,192 A * | 11/1975 | Alvarez-Calderon | | 244/214 |
| 4,784,355 A | 11/1988 | Brine | | |
| 6,802,475 B2 | 10/2004 | Davies et al. | | |
| 7,243,881 B2 | 7/2007 | Sakurai et al. | | |
| 7,258,308 B2 | 8/2007 | Beyer et al. | | |
| 7,309,043 B2 | 12/2007 | Good et al. | | |
| 7,338,018 B2 | 3/2008 | Huynh et al. | | |
| 8,226,048 B2 | 7/2012 | Beyer et al. | | |
| 8,302,914 B2 * | 11/2012 | Zeumer | | 244/215 |
| 8,746,625 B2 * | 6/2014 | Recksiek et al. | | 244/215 |
| 2006/0175468 A1 * | 8/2006 | Huynh et al. | | 244/212 |
| 2007/0034748 A1 * | 2/2007 | Sakurai et al. | | 244/215 |
| 2007/0114328 A1 * | 5/2007 | Lacy et al. | | 244/34 R |
| 2007/0176051 A1 * | 8/2007 | Good et al. | | 244/215 |
| 2008/0265089 A1 * | 10/2008 | Zeumer | | 244/99.3 |
| 2011/0139937 A1 * | 6/2011 | Zeumer | | 244/215 |
| 2012/0248257 A1 * | 10/2012 | Eichhorn et al. | | 244/214 |

* cited by examiner

*Primary Examiner* — Philip J Bonzell

(57) ABSTRACT

A hinged panel operation system is provided having a mechanical linkage assembly coupled between a fixed structure and a trailing edge device. The mechanical linkage assembly has a first link operatively coupled to the trailing edge device, a second link pivotably connected at a first end to the first link and pivotably connected at a second end to a third link, and an eccentric attachment connecting the second link to the third link. The hinged panel operation system further has a hinged panel positioned forward of the trailing edge device and being operatively coupled to the mechanical linkage assembly. The hinged panel is movable by the mechanical linkage assembly between a stowed position and a drooped position. The mechanical linkage assembly provides a load path to the hinged panel.

20 Claims, 12 Drawing Sheets

HINGED PANEL OPERATION SYSTEMS AND METHODS

BACKGROUND

1) Field of the Disclosure

The disclosure relates generally to systems and methods for operation of hinged panels and spoilers, and more specifically, to systems and methods for operation of hinged panels and spoilers for aircraft, including aircraft hinged panel and spoiler droop systems and methods.

2) Description of Related Art

The wings of high-speed transport vehicles, such as aircraft or other air vehicles, typically include various movable surfaces or devices to provide aircraft control and/or to configure the aircraft for low speed operations, such as aircraft takeoff and landing. Such movable surfaces or devices may include, for example, leading edge devices, such as flaps and slats, and trailing edge devices, such as hinged panels or spoilers, flaps, and ailerons. These movable surfaces or devices are typically movable between a stowed position and a variety of deployed or extended positions, depending upon the particular flight condition of the aircraft. For example, during the cruise mode of the aircraft, these movable surfaces and devices may be stowed or retracted to reduce aircraft drag, and during the takeoff or landing modes of the aircraft, these movable surfaces and devices may be deployed or extended to increase aircraft lift.

In the design and manufacture of high-speed transport vehicles, such as aircraft or other air vehicles, it is desirable to improve low speed performance of the aircraft by decreasing the minimum takeoff and landing distances of the aircraft. Improved efficiency and performance of aircraft takeoff and landing may result in reduced aircraft fuel consumption, and in turn, may result in reduced aircraft fuel costs. It has been found that drooping or downwardly lowering the hinged panels or spoilers of the aircraft wing during takeoff and landing may improve airflow proximate to the wing and to a deployed trailing edge flap, as compared to when the hinged panels or spoilers are not drooped. Such improved airflow may improve the overall performance of the wing by increasing lift and/or decreasing drag.

Known systems and methods exist for operating spoilers. One such known system includes using a hydraulic actuator system that drives a spoiler in both an upward position and in a downward position. However, on aircraft where aircraft evacuation slides may be required at the most inboard sides of the aircraft wings on overwing exits, such spoilers cannot be raised in an upward position due to the aircraft evacuation slide requirement of unobstructed aircraft slide escape paths. In addition, known spoilers driven by hydraulic actuator systems may require the use of additional electro-mechanical actuators in order to meet aircraft roll capability requirements. However, such additional electro-mechanical actuators may increase system complexity and weight, and may result in increased installation and maintenance costs.

Another known system for operating spoilers includes a deep (long) hinge flap system that uses a mechanical straight linkage system to drive the spoiler to a drooped position. However, such mechanical straight linkage system of the deep hinge flap system may span a significant distance, e.g., 6 feet below the wing surface, and may thus add weight and complexity to the system, and may result in increased manufacturing and operation costs.

Accordingly, there is a need in the art for improved systems and methods for operation of hinged panels or spoilers that provide advantages over known systems and methods.

SUMMARY

This need for improved systems and methods for operation of hinged panels or spoilers is satisfied. As discussed in the below detailed description, embodiments of improved systems and methods for operation of hinged panels or spoilers may provide significant advantages over known systems and methods.

In one embodiment of the disclosure, there is provided a hinged panel operation system. The hinged panel operation system comprises a mechanical linkage assembly coupled between a fixed structure and a trailing edge device. The mechanical linkage assembly comprises a first link operatively coupled to the trailing edge device, a second link pivotably connected at a first end to the first link and pivotably connected at a second end to a third link, and an eccentric attachment connecting the second link to the third link. The hinged panel operation system further comprises a hinged panel positioned forward of the trailing edge device and being operatively coupled to the mechanical linkage assembly. The hinged panel is movable by the mechanical linkage assembly between a stowed position and a drooped position. The mechanical linkage assembly provides a load path to the hinged panel.

In another embodiment of the disclosure, there is provided an aircraft system. The aircraft system comprises a wing of an aircraft. The wing has a wing body, a wing upper surface, and a trailing edge. The aircraft system further comprises a flap coupled to the trailing edge and being movable relative to the wing between a retracted position and a deployed position. The aircraft system further comprises a hinged panel operation system coupled between the wing body and the flap. The hinged panel operation system comprises a mechanical linkage assembly. The mechanical linkage assembly comprises a first link operatively coupled to the flap, a second link pivotably connected at a first end to the first link and pivotably connected at a second end to a third link, and an eccentric attachment connecting the second link to the third link. The hinged panel operation system further comprises a hinged panel positioned forward of the flap on a portion of the wing upper surface and being operatively coupled to the mechanical linkage assembly. The hinged panel is movable by the mechanical linkage assembly between a stowed position and a drooped position, and the mechanical linkage assembly providing a load path to the hinged panel. The aircraft system further comprises a control device operatively coupled to the mechanical linkage assembly. The control device is configured to control the mechanical linkage assembly to move the hinged panel to a selected position.

In another embodiment of the disclosure, there is provided a method for operating a hinged panel in an aircraft. The method comprises the step of operatively coupling a mechanical linkage assembly to a hinged panel on a wing of an aircraft and to a trailing edge device positioned aft of the hinged panel. The mechanical linkage assembly comprises a first link operatively coupled to the trailing edge device. The mechanical linkage assembly further comprises a second link pivotably connected at a first end to the first link and pivotably connected at a second end to a third link. The mechanical linkage assembly further comprises an eccentric attachment connecting the second link to the third link. The method further comprises the step of using the mechanical linkage assembly to provide a load path to the hinged panel. The method further comprises the step of drooping the hinged panel from a stowed position to a drooped position using the mechanical linkage assembly, resulting in improved low speed performance of the aircraft during a takeoff mode and a landing mode.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
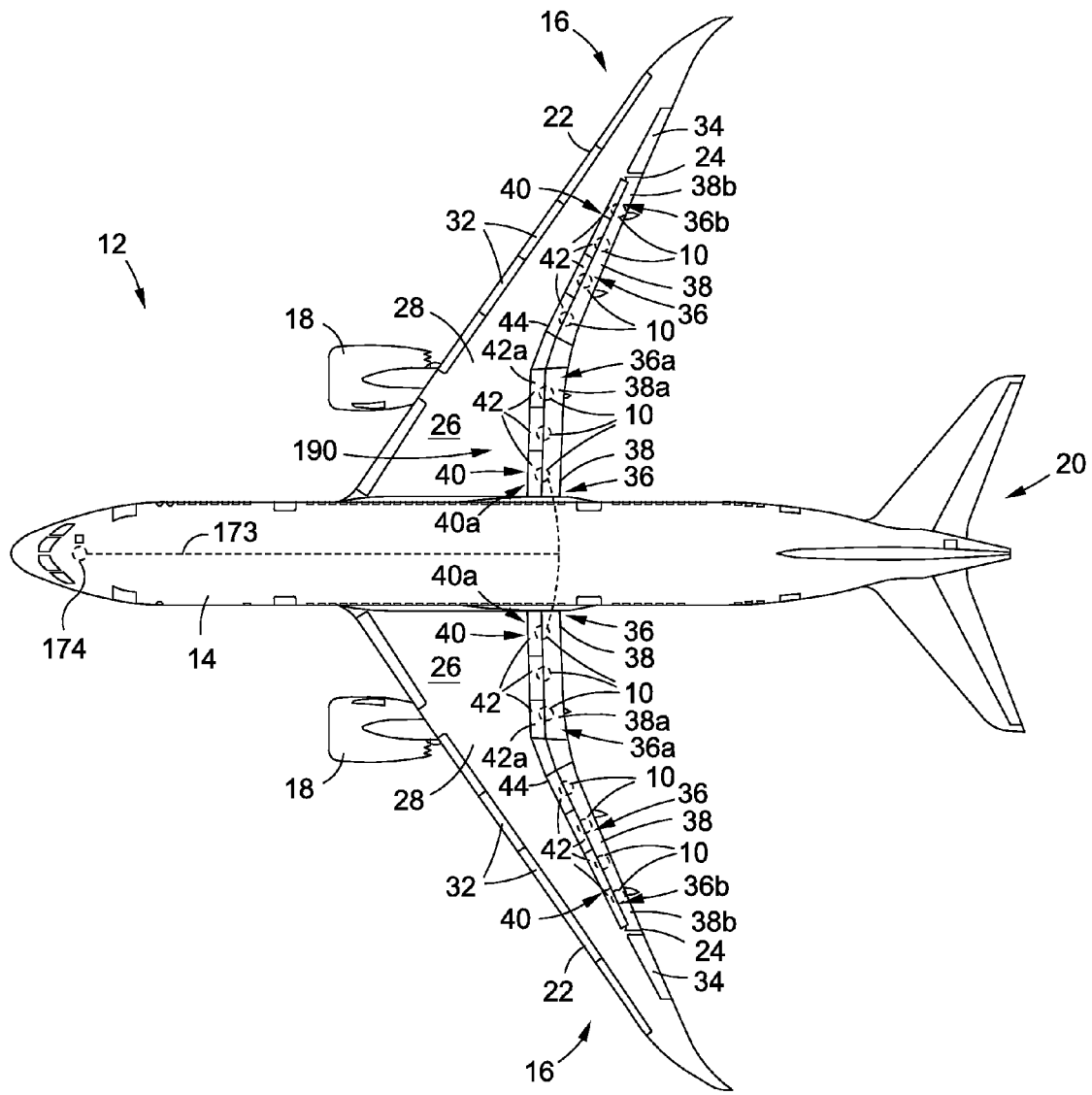
FIG. 1 is an illustration of a plan view of an aircraft that may incorporate one or more embodiments of a hinged panel operation system of the disclosure.

Now referring to the Figures, FIG. 1 is an illustration of a perspective view of an aircraft 12 that may incorporate one or more embodiments of a hinged panel operation system 10 of the disclosure. As shown in FIG. 1, the aircraft 12 comprises a fuselage 14, wings 16, one or more propulsion units 18, and an empennage 20. As further shown in FIG. 1, each of the wings 16 comprises a leading edge 22, a trailing edge 24, a wing body 26, a wing upper surface 28, a wing lower surface 30 (see FIG. 4A), slats 32, ailerons 34, trailing edge devices 36 such as in the form of flaps 38, and hinged panels 40 such as in the form of spoilers 42. As further shown in FIG. 1, the trailing edge devices 36, such as in the form of flaps 38, may include an inboard trailing edge device 36a, such as in the form of an inboard flap 38a, and an outboard trailing edge device 36b, such as in the form of an outboard flap 38b. As further shown in FIG. 1, the hinged panel 40, such as in the form of spoiler 42, may include an inboard hinged panel 40a, such as in the form of an inboard spoiler 42a. The trailing edge devices 36 are positioned aft of the hinged panels 40, and the hinged panels 40 are positioned forward of the trailing edge devices 36. The hinged panels 40 are attached to the wing upper surface 28 at a hinge line 44. Although the aircraft 10 shown in FIG. 1 is generally representative of a commercial passenger aircraft having one or more embodiments of the hinged panel operation system 10, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles, as well as automobiles, trucks, or other structures suitable for incorporating one or more embodiments of the hinged panel operation system 10 of the disclosure.

Figure 2:
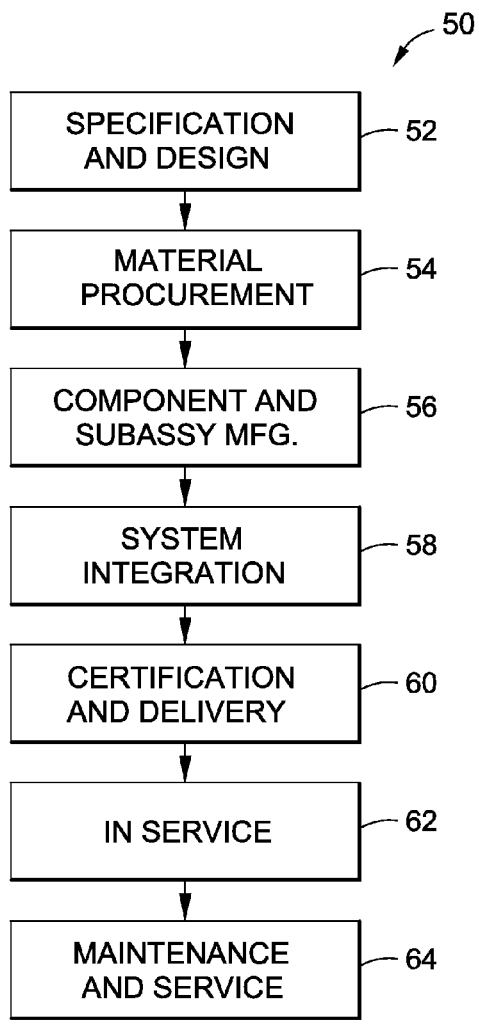
FIG. 2 is an illustration of a flow diagram of an aircraft production and service method.
Figure 3:
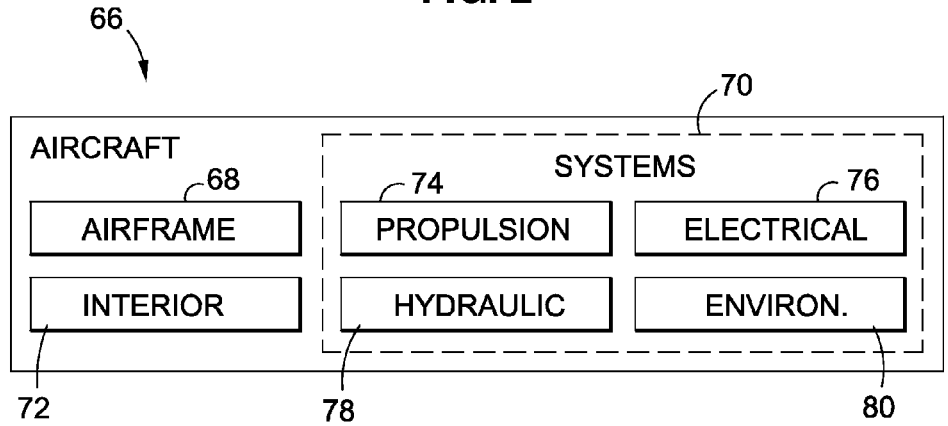
FIG. 3 is an illustration of a block diagram of an aircraft.

FIG. 2 is an illustration of a flow diagram of an aircraft production and service method 50. FIG. 3 is an illustration of a block diagram of an aircraft 66. Referring to FIGS. 2-3, embodiments of the disclosure may be described in the context of the aircraft manufacturing and service method 50 as shown in FIG. 2 and the aircraft 66 as shown in FIG. 3. During pre-production, exemplary method 50 may include specification and design 52 of the aircraft 66 and material procurement 54. During production, component and subassembly manufacturing 56 and system integration 58 of the aircraft 66 takes place. Thereafter, the aircraft 66 may go through certification and delivery 60 in order to be placed in service 62. While in service 62 by a customer, the aircraft 66 may be scheduled for routine maintenance and service 64 (which may also include modification, reconfiguration, refurbishment, and other suitable services).

Each of the processes of method 50 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and other suitable operators.

As shown in FIG. 3, the aircraft 66 produced by exemplary method 50 may include an airframe 68 with a plurality of systems 70 and an interior 72. Examples of high-level systems 70 may include one or more of a propulsion system 74, an electrical system 76, a hydraulic system 78, and an environmental system 80. Any number of other systems may be included. Although an aerospace example is shown, the principles of the disclosure may be applied to other industries, such as the automotive industry.

Methods and systems embodied herein may be employed during any one or more of the stages of the production and service method 50. For example, components or subassemblies corresponding to component and subassembly manufacturing 56 may be fabricated or manufactured in a manner similar to components or subassemblies produced while the aircraft 66 is in service. Also, one or more apparatus embodiments, method embodiments, or a combination thereof, may be utilized during component and subassembly manufacturing 56 and system integration 58, for example, by substantially expediting assembly of or reducing the cost of the aircraft 66. Similarly, one or more of apparatus embodiments, method embodiments, or a combination thereof, may be utilized while the aircraft 66 is in service, for example and without limitation, to maintenance and service 64.

Figure 4A:
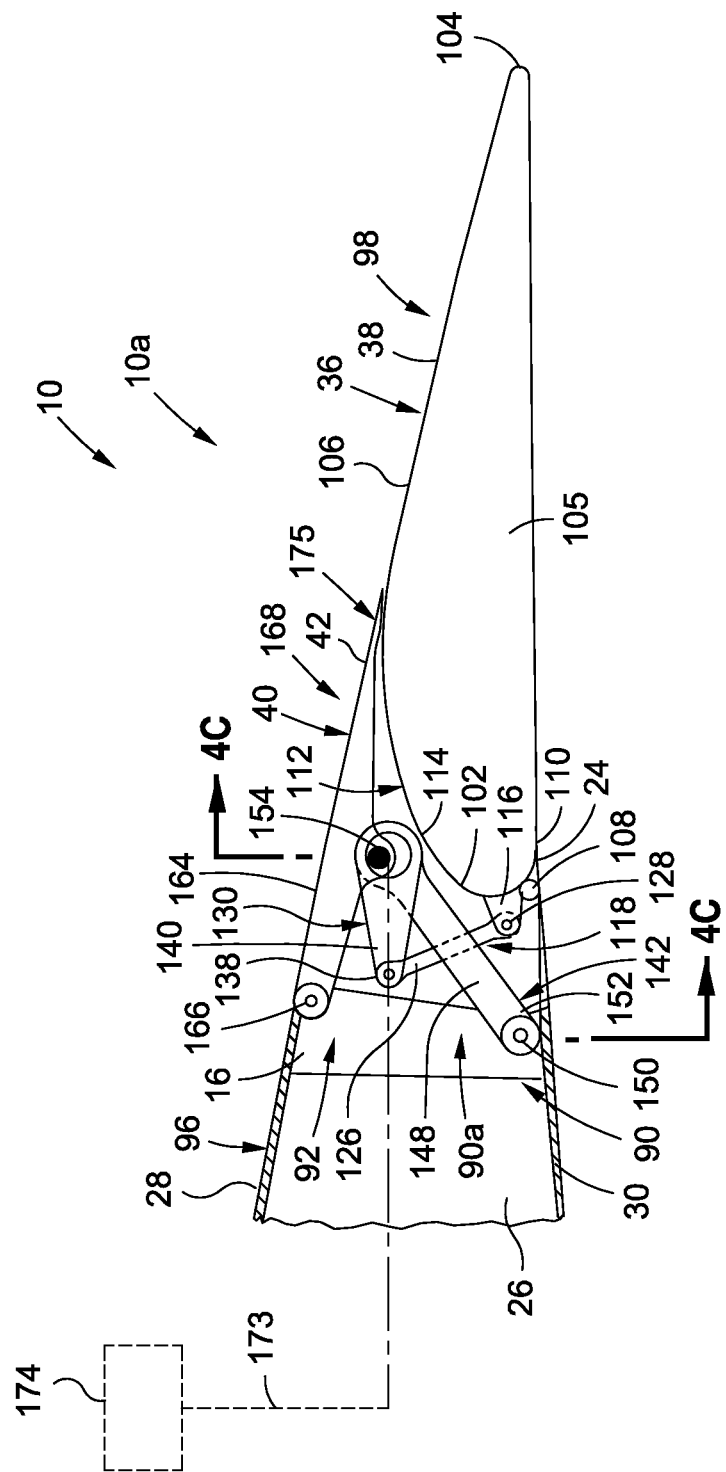
FIG. 4A is an illustration of a partial cross-sectional side view of an embodiment of a hinged panel operation system of the disclosure in a stowed position.
Figure 4B:
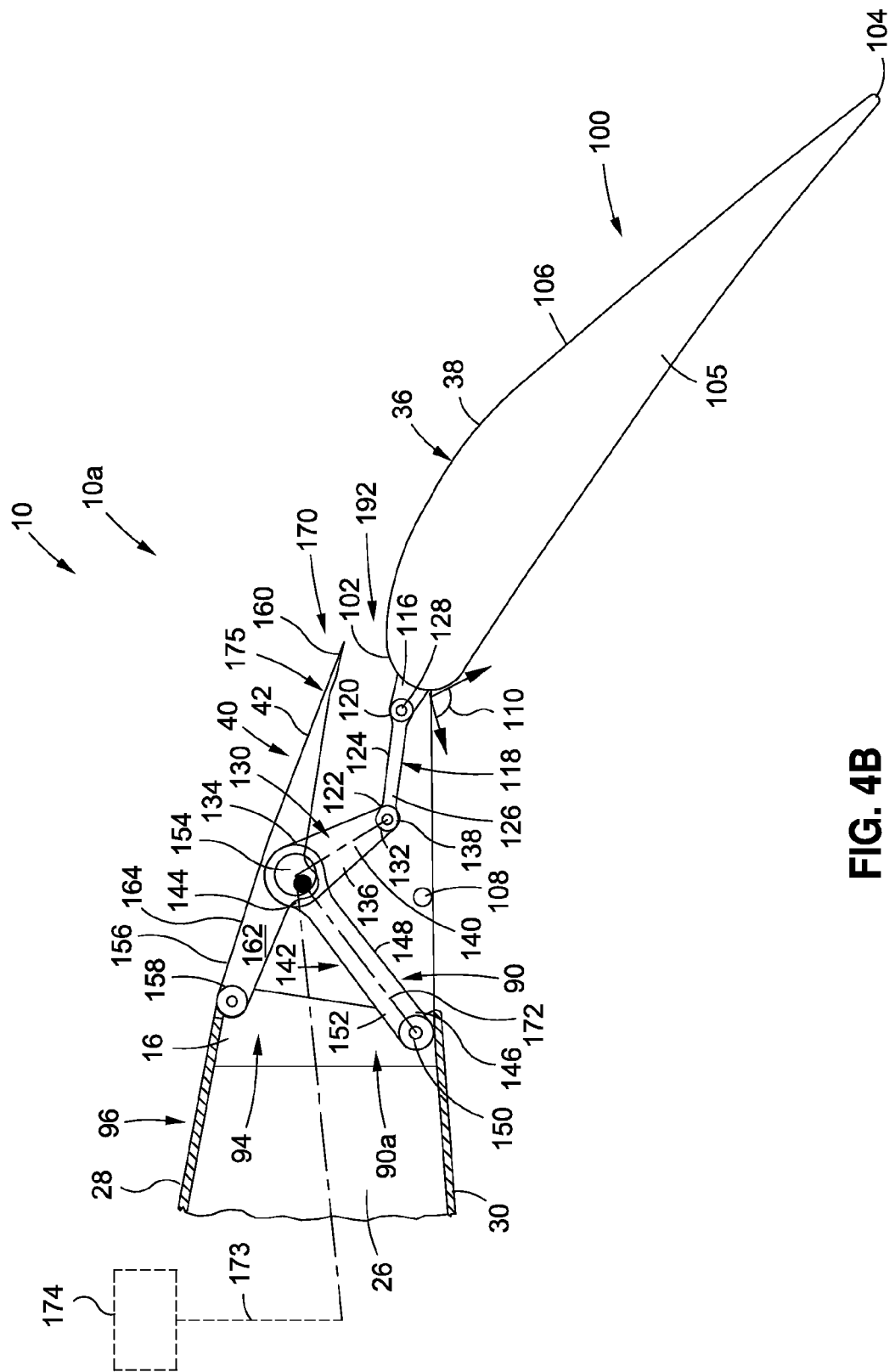
FIG. 4B is an illustration of a partial cross-sectional side view of the embodiment of the hinged panel operation system of FIG. 4A in a deployed position.

In one embodiment of the disclosure, as shown in FIG. 4A, there is provided a hinged panel operation system 10. FIG. 4A is an illustration of a partial cross-sectional side view of an embodiment of the hinged panel operation system 10, in the form of hinged panel operation system 10a, in a stowed position. As shown in FIG. 4A, the hinged panel operation system 10 comprises a mechanical linkage assembly 90, such as in the form of mechanical linkage assembly 90a, and is shown in an assembly stowed position 92, such as during a cruise mode of the aircraft 12 (see FIG. 1). FIG. 4B is an illustration of a partial cross-sectional side view of the embodiment of the hinged panel operation system 10, in the form of hinged panel operation system 10a, in a deployed position. As shown in FIG. 4B, the mechanical linkage assembly 90, such as in the form of mechanical linkage assembly 90a, is in an assembly deployed position 94, such as during a landing mode of the aircraft 12 (see FIG. 1).

As shown in FIGS. 4A-4B, the mechanical linkage assembly 90 is preferably coupled between a fixed structure 96 and a trailing edge device 36. The fixed structure 96 preferably comprises a wing 16 (see FIG. 4A) of an aircraft 12 (see FIG. 1) or another fixed structure on the aircraft 12 or on another vehicle or structure. As shown in FIGS. 4A-4B, the wing 16 has a wing body 26, a wing upper surface 28, and a wing lower surface 30. As further shown in FIGS. 4A-4B, the trailing edge device 36, such as in the form of a flap 38, is coupled to the trailing edge 24 of the wing 16 and is also coupled to the mechanical linkage assembly 90. The trailing edge device 36, such as in the form of flap 38, is configured to be movable and is preferably moved by the mechanical linkage assembly 90 between a retracted position 98 (see FIG. 4A) and a deployed position 100 (see FIG. 4B).

As further shown in FIGS. 4A-4B, the trailing edge device 36, such as in the form of flap 38, preferably has a leading end 102, a trailing end 104, a body 105 therebetween, and an upper flow surface 106. As shown in FIG. 4A, in the retracted position 98, the leading end 102 of the trailing edge device 36 may be in contact with a stop element 108. As further shown in FIG. 4A, in the retracted position 98 during, for example, the cruise mode of the aircraft 12 (see FIG. 1), the trailing edge device 36, such as in the form of flap 38, has a flap angle 110 at zero (0) degrees. As shown in FIG. 4A, in the retracted position 98, the upper flow surface 106 of the trailing edge device 36, such as in the form of flap 38, along with an upper flow surface 164 of a hinged panel 40, form a generally smooth upper flow surface with the wing upper surface 28 of the wing 16.

As shown in FIG. 4B, in the deployed position 100, the leading end 102 of the trailing edge device 36 is not in contact with the stop element 108. As further shown in FIG. 4B, in the deployed position 100, such as during a landing mode of the aircraft 12, the trailing edge device 36, such as in the form of flap 38, may be deployed at a flap angle 110, such as about 37 degrees relative to the trailing edge 24 (see FIG. 4A) of the wing 16. In the deployed position 100, such as during a takeoff mode (not shown) of the aircraft 12, the trailing edge device 36, such as in the form of flap 38, may be deployed at a flap angle 110, such as about 20 degrees relative to the trailing edge 24 of the wing 16.

As further shown in FIGS. 4A-4B, the trailing edge device 36, such as in the form of flap 38, preferably has an outer contour portion 112, such as an outer flap contour 114, having an attachment element 116 for attachment to the mechanical linkage assembly 90. When the trailing edge devices 36, such as in the form of flaps 38, are deployed in the deployed position 100, the lift and drag of the wing 16 increases and the aircraft takeoff and landing distances may be shortened. The type of trailing edge devices 36, such as in the form of flaps 38, chosen depends on the size, complexity, and speed of the aircraft on which they are used. Known trailing edge devices, in the form of flaps, that may be used with embodiments of the hinged panel operation system 10 disclosed herein may comprise plain flaps, slotted flaps, Fowler flaps, or other suitable flaps.

The trailing edge device 36, such as in the form of flap 38, is preferably an inboard trailing edge device 36a (see FIG. 1), such as in the form of an inboard flap 38a (see FIG. 1). The trailing edge device 36, such as in the form of flap 38, may also be the inboard flaps of outboard wing panels, for example, the outboard trailing edge device 36b (see FIG. 1), such as in the form of the outboard flap 38b (see FIG. 1).

As shown in FIGS. 4A-4B, the mechanical linkage assembly 90 comprises a first link 118 operatively coupled to the trailing edge device 36, such as in the form of flap 38. As shown in FIG. 4B, the first link 118 has a first end 120, a second end 122, and an elongated body 124 therebetween. The first link 118 preferably comprises a drive link member 126 (see FIG. 4B). The drive link member 126 preferably has a drive link attachment point 128 (see FIG. 4B) for attachment to the attachment element 116 (see FIG. 4B) extending from the outer contour portion 112 of the trailing edge device 36. As shown in FIG. 4B, the first end 120 of the first link 118, such as in the form of drive link member 126, is preferably attached to the trailing edge device 36, such as in the form of flap 38, via the attachment element 116 at the drive link attachment point 128. The first link 118 attach point, such as in the form of the drive link attachment point 128, is preferably outside the outer contour portion 112, such as the outer flap contour 114, and thus there is no interference by the mechanical linkage assembly 90 in the structure or configuration of the trailing edge device 36, such as in the form of flap 38.

Figure 4C:
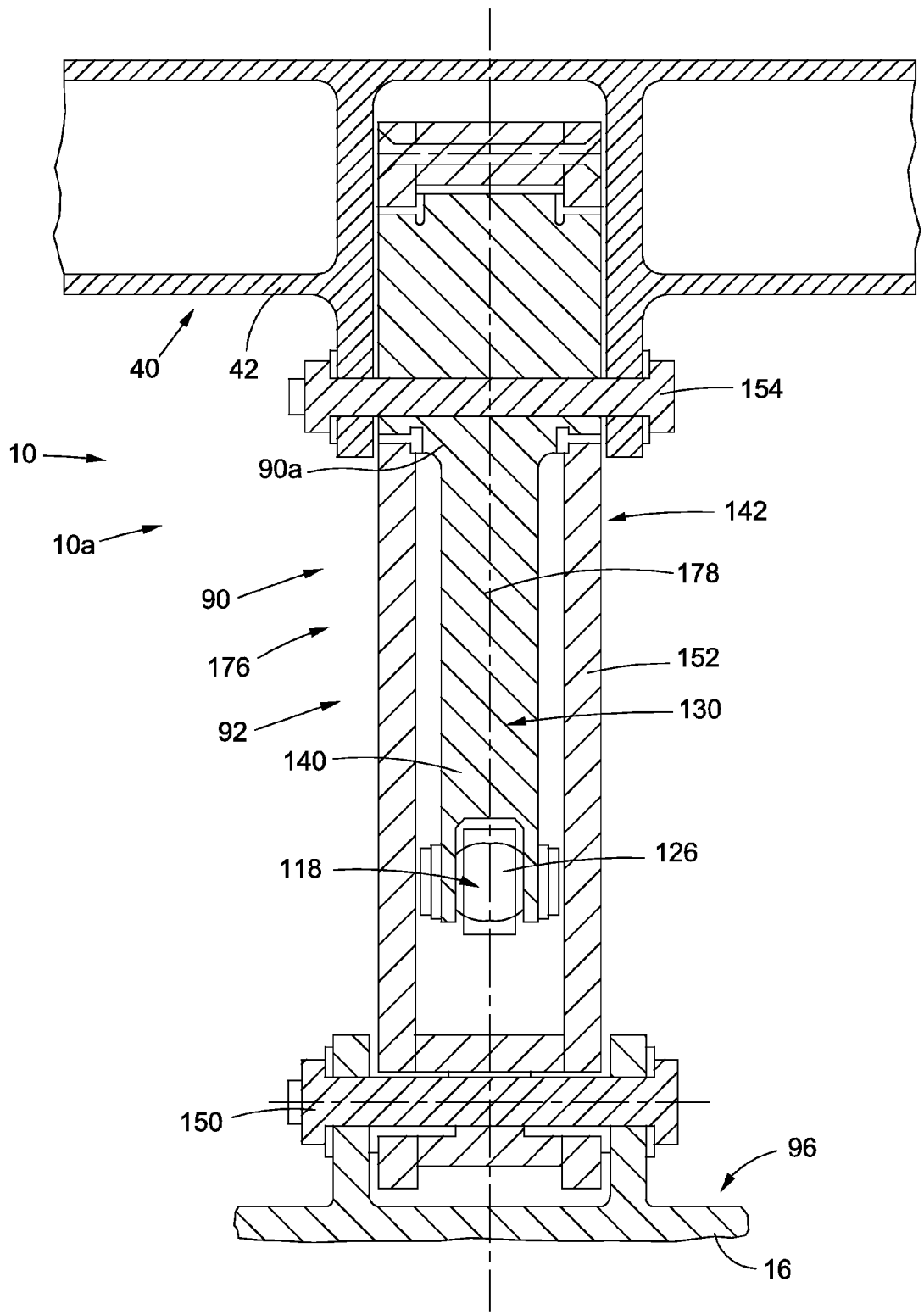
FIG. 4C is an illustration of a cross-sectional view taken along lines 4C-4C of FIG. 4A.

As shown in FIG. 4A, the mechanical linkage assembly 90 further comprises a second link 130. As shown in FIG. 4B, the second link 130 has a first end 132, a second end 134, and an elongated body 136 therebetween. The first end 132 of the second link 130 is preferably pivotably connected via a pivot connector 138 (see FIG. 4A) to the second end 122 of the first link 118. In the embodiment of the mechanical linkage assembly 90, such as in the form of mechanical linkage assembly 90a, as shown in FIGS. 4B-4C, the second link 130 may comprise a crank shaft link 140.

As shown in FIGS. 4A-4B, the mechanical linkage assembly 90 further comprises a third link 142. As shown in FIG. 4B, the third link 142 has a first end 144, a second end 146, and an elongated body 148 therebetween. The second end 134 of the second link 130 is preferably pivotably connected to the first end 144 of the third link 142 via an eccentric attachment 154 (see FIG. 4B). As shown in FIG. 4B, the second end 146 of the third link 142 is preferably connected to the fixed structure 96, such as the wing 16, via an attachment element 150. The third link 142 may be movable with respect to the second link 130. In the embodiment of the mechanical linkage assembly 90, such as in the form of mechanical linkage assembly 90a, as shown in FIGS. 4B-4C, the third link 142 may comprise a loading link 152.

As shown in FIGS. 4A-4B, the mechanical linkage assembly 90 further comprises an eccentric attachment 154, such as in the form of a spherical bearing or bolt fixed to the rotating second link 130 with its center offset from that of the second link 130. As used herein, "eccentric attachment" means a device for changing rotary to back-and-forth motion, including a spherical bearing, a bolt, or a disk that is mounted off center on a shaft and whose axis of rotation does not coincide with its geometric center. In linkage, an eccentric acts as a crank, that is, as a link that makes a complete revolution around its axis of rotation. Such an application of an eccentric is efficient when the crank (its throw equal to the eccentricity of an eccentric) must be very short. The eccentric attachment 154 disclosed herein preferably allows the hinged panel 40, such as in the form of spoiler 42, to droop relative to the second link 130, such as the crank shaft link 140. As shown in FIG. 4A, the eccentric attachment 154 preferably connects the second link 130 to the third link 142. In the embodiment of the mechanical linkage assembly 90, such as in the form of mechanical linkage assembly 90a, as shown in FIG. 4B, the eccentric attachment 154 preferably connects the second end 134 of the second link 130 to the first end 144 of the third link 142, and further in this embodiment, the eccentric attachment 154 is preferably attached to a hinged panel 40 (see FIGS. 4A-4B).

As shown in FIGS. 4A-4B, the hinged panel operation system 10, such as in the form of hinged panel operation system 10a, further comprises the hinged panel 40 positioned forward of the trailing edge device 36. The hinged panel 40 is preferably operatively coupled to the mechanical linkage assembly 90. The hinged panel 40 is preferably a high hinge upper hinged panel 156 (see FIG. 4B) and may be in the form of a spoiler 42 (see FIGS. 1, 4B). As shown in FIG. 4B, the hinged panel 40 has a leading end 158, a trailing end 160, a hinged panel body 162 therebetween, and an upper flow surface 164 (see FIG. 4A). The leading end 158 (see FIG. 4B) of the hinged panel 40 is preferably connected to the fixed structure 96 (see FIG. 4A), such as the wing 16 (see FIG. 4A), via an attachment element 166 (see FIG. 4A). The hinged panel 40 may be used on inboard hinged panels 40a (see FIG. 1) or outboard panels. The spoiler 42 is preferably an inboard spoiler 42a (see FIG. 1).

As shown in FIGS. 4A-4B, the hinged panel 40 is configured to be movable and is preferably moved by the mechanical linkage assembly 90 between a stowed position 168 (see FIG. 4A) and a drooped position 170 (see FIG. 4B). The mechanical linkage assembly 90 provides a load path 172 (see FIG. 4B) to the hinged panel 40.

In this embodiment, when the second link 130, in the form of the crank link shaft 140, is pivotably rotated about the eccentric attachment 154, the crank link shaft 140 moves or pulls the hinged panel 40 downward relative to the crank link shaft 140 and the loading link 152, and causes the hinged panel 40 to droop or lower downwardly into the drooped position 170 (see FIG. 4B). As the trailing edge device 36, such as in the form of flap 38, moves from the retracted position 98 (see FIG. 4A) to the deployed position 100 (see FIG. 4B), the first link 118, such as in the form of drive link member 126 (see FIG. 4B) causes the second link 130, such as in the form of crank shaft link 140 (see FIG. 4B) to pivot about the eccentric attachment 154 (see FIG. 4B), moving the hinged panel 40 downward and causing the hinged panel 40 to droop (e.g., causing the hinged panel 40 to move closer to the eccentric attachment 154 with the trailing end 160 (see FIG. 4B) of the hinged panel 40 moving toward the leading end 102 (see FIG. 4B) of the deployed trailing edge device 36 (see FIG. 4B), such as in the form of flap 38.

The crank link shaft 140 in combination with eccentric attachment 154 acts as a bellcrank with a very short arm to droop the hinged panel 40 or spoiler 42, and works with a high hinge flap system rather than a deep hinge flap system. The crank link shaft 140 in combination with eccentric attachment 154 may accommodate a very long stroke input by the flap 38 and a very short output bellcrank movement requirement. In this embodiment, the crank link shaft 140 provides a load path 172 (see FIG. 4B) for the hinged panel 40 or spoiler 42, and the drive link member 126 of the mechanical linkage assembly 90a, droops the hinged panel 40 or spoiler 42.

The drooping of the hinged panel 40 may improve airflow proximate to the wing 16, and the deployed trailing edge device 36 (see FIG. 4B), such as in the form of flap 38, as compared to when the hinged panel 40 is not drooped. This improved airflow may improve low speed performance of the aircraft 12, which, in turn, allows for improved takeoff and landing performance of the aircraft 12 by increasing lift, decreasing drag, and/or improving high angle of attack characteristics.

As shown in FIGS. 4A-4B, the mechanical linkage assembly 90 may be operatively coupled via a control connection 173 to a control device 174. The control device 174 is preferably configured to control the mechanical linkage assembly 90 to move the hinged panel 40 to a selected position 175 (see FIGS. 4A-4B) such as the stowed position 168 (see FIG. 4A) when the aircraft 12 (see FIG. 1) is in the cruise mode, and such as the drooped position 170 (see FIG. 4B) when the aircraft 12 (see FIG. 1) is in the takeoff mode or the landing mode.

The control device 174 may be in the form of a mechanical controller, such as a lever or pneumatic device, an electrical controller such as an electronic device with electronic controls, a digital controller such as a computer or multifunction display, or another suitable control device. The control connection 173 between the control device 173 and the mechanical linkage assembly 90 may comprise a mechanical link; an electrical link such as an electrical cable, an optical cable, or another link configured to transmit electromagnetic signals between the control device 174 and the mechanical linkage assembly 90; a digital link; or another suitable link. The control device 174 may receive inputs from a pilot or other aircraft operator and may receive further inputs from one or more sensors (not shown). The mechanical linkage assembly 90 further controls deployment and retraction of the trailing edge device 36, such as in the form of flap 38.

FIG. 4C is an illustration of a cross-sectional view taken along lines 4C-4C of FIG. 4A. FIG. 4C shows a view looking from the rear of an aircraft forward when the mechanical linkage assembly 90 is in the assembly stowed position 92. As shown in FIG. 4C, the first link 118, the second link 130, the third link 142, and the eccentric attachment 154 are preferably in an inline configuration 176 and centered about a third link centerline 178 of the third link 142 when the mechanical linkage assembly 90 is in the assembly stowed position 92. As further shown in FIG. 4C, in this embodiment, the eccentric attachment 154 is attached through the hinged panel 40, is attached through the second link 130, and is attached through the third link 142.

Figure 5A:
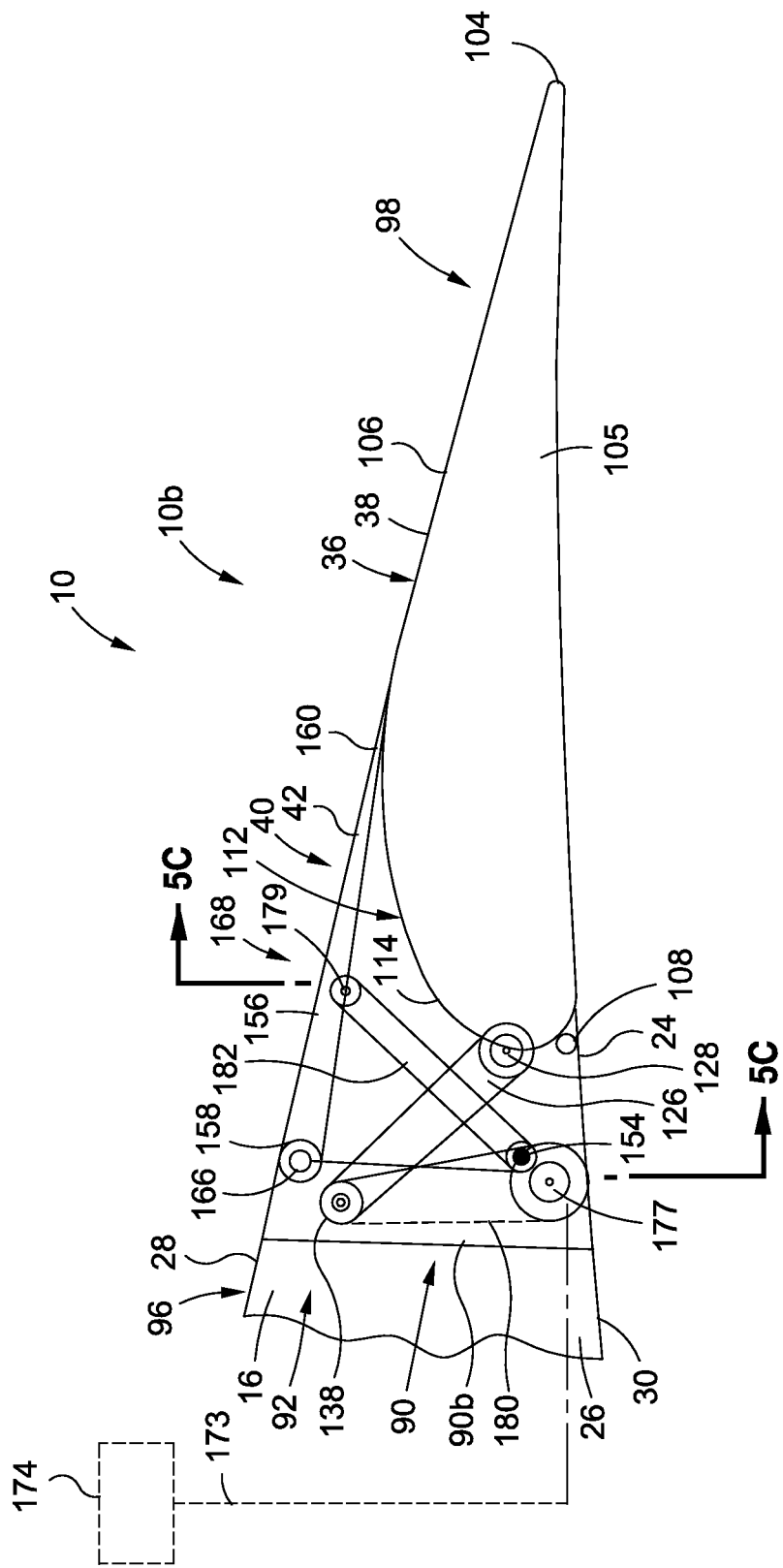
FIG. 5A is an illustration of a partial cross-sectional side view of another embodiment of a hinged panel operation system of the disclosure in a stowed position.
Figure 5B:
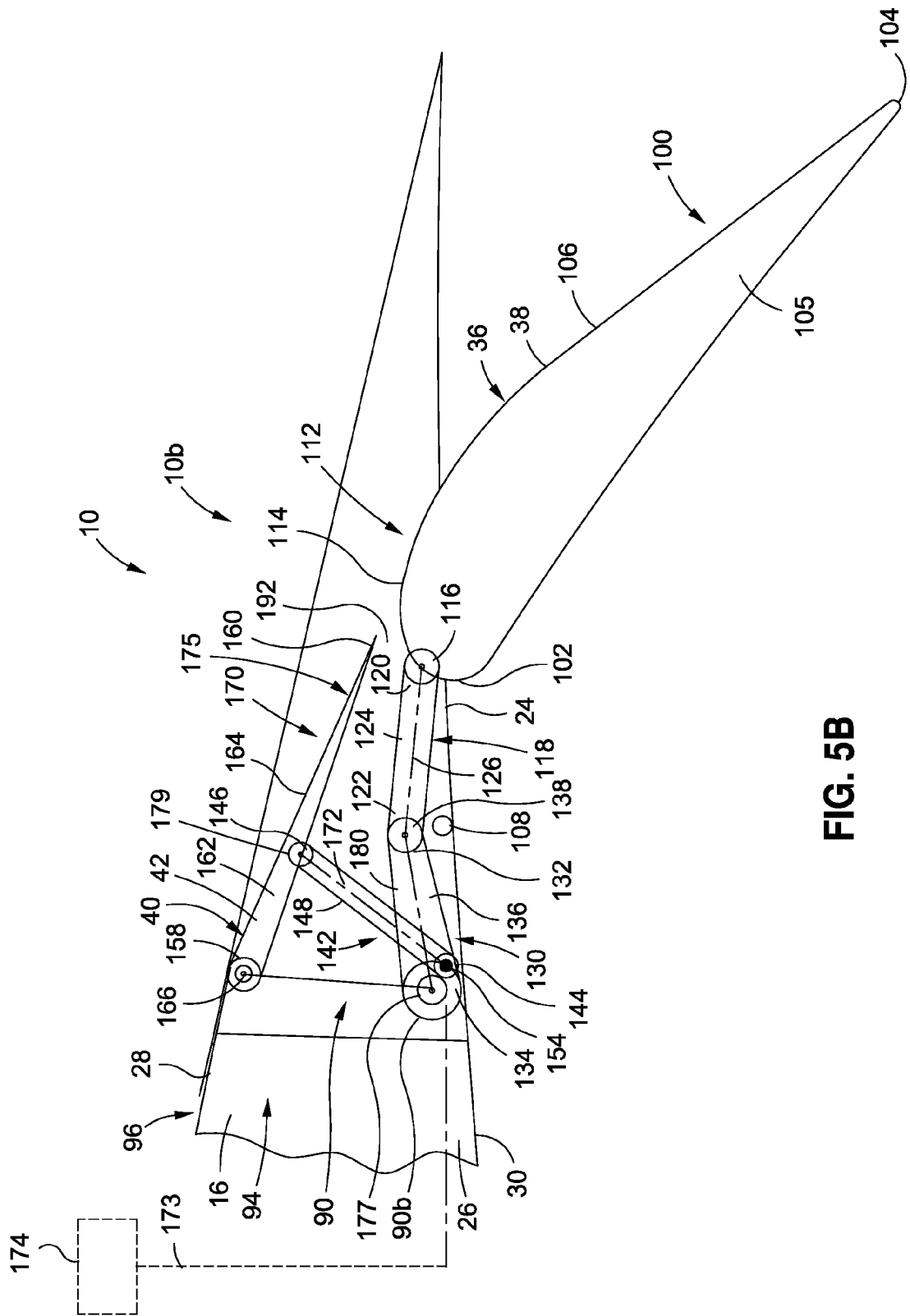
FIG. 5B is an illustration of a partial cross-sectional side view of the embodiment of the hinged panel operation system of FIG. 5A in a deployed position.

FIG. 5A is an illustration of a partial cross-sectional side view of another embodiment of a hinged panel operation system 10, in the form of hinged panel operation system 10b, of the disclosure. As shown in FIG. 5A, the hinged panel operation system 10, in the form of hinged panel operation system 10b, comprises a mechanical linkage assembly 90, such as in the form of mechanical linkage assembly 90b, shown in the assembly stowed position 92, such as during a cruise mode of the aircraft 12 (see FIG. 1). FIG. 5B is an illustration of a partial cross-sectional side view of the embodiment of the hinged panel operation system 10, such as in the form of the hinged panel operation system 10b of FIG. 5A. As shown in FIG. 5B, the mechanical linkage assembly 90, such as in the form of mechanical linkage assembly 90b, is shown in an assembly deployed position 94, such as during a landing mode or a takeoff mode of the aircraft 12 (see FIG. 1).

The embodiment of the hinged panel operation system 10, in the form of hinged panel operation system 10b, as shown in FIGS. 5A-5B, is similar to the embodiment shown in FIGS. 4A-4B, except that the second link 130 (see FIG. 5B) and the third link 142 (see FIG. 5B) of the mechanical linkage assembly 90b (see FIG. 5B) are in a reversed position from the second link 130 (see FIG. 4B) and the third link 142 (see FIG. 4B) of the mechanical linkage assembly 90a (see FIG. 4B). In the embodiment shown in FIGS. 5A-5B, as shown in FIG. 5B, the second end 134 of the second link 130 is attached to the fixed structure 96 via an attachment element 177, the second end 146 of the third link 142 is attached to the hinged panel 40 via an attachment element 179, and the eccentric attachment 154 is not attached to the hinged panel 40. In the embodiment shown in FIGS. 5A-5B, as shown in FIG. 5A, the second link 130 may be in the form of a support link 180, and the third link 142 may be in the form of a hinged panel bellcrank link 182.

Figure 5C:
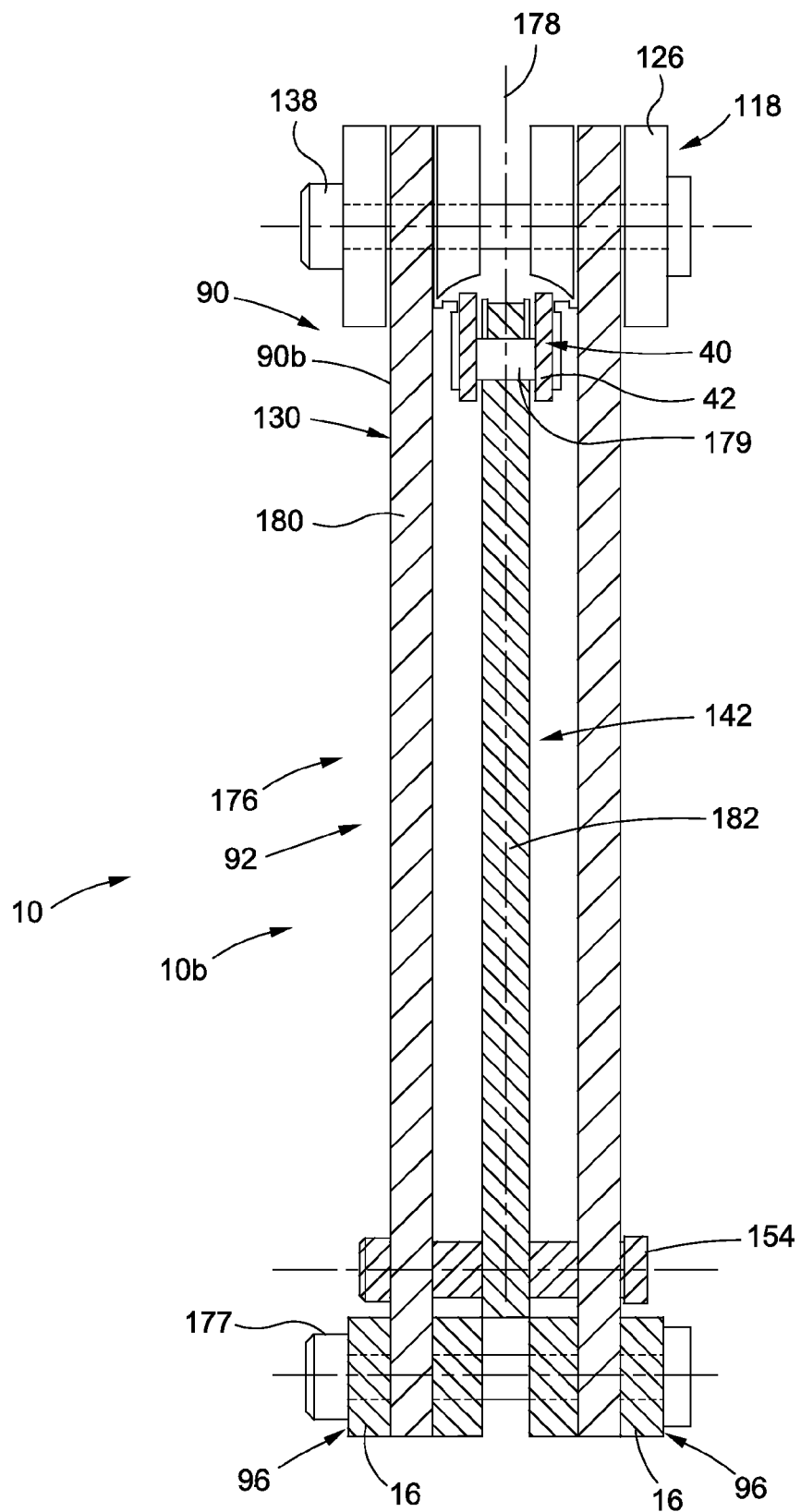
FIG. 5C is an illustration of a cross-sectional view taken along lines 5C-5C of FIG. 5A.

FIG. 5C is an illustration of a cross-sectional view taken along lines 5C-5C of FIG. 5A. FIG. 5C shows a view looking from the rear of an aircraft forward when the mechanical linkage assembly 90, such as in the form of mechanical linkage assembly 90b, is in the assembly stowed position 92. As shown in FIG. 5C, the first link 118, the second link 130, the third link 142, and the eccentric attachment 154 are preferably in an inline configuration 176 and centered about a third link centerline 178 of the third link 142 when the mechanical linkage assembly 90 is in the assembly stowed position 92. As further shown in FIG. 5C, in this embodiment, the eccentric attachment 154 is attached through the second link 130 and is attached through the third link 142 and is proximate the fixed structure 96 instead of being attached through the hinged panel 40.

Figure 6A:
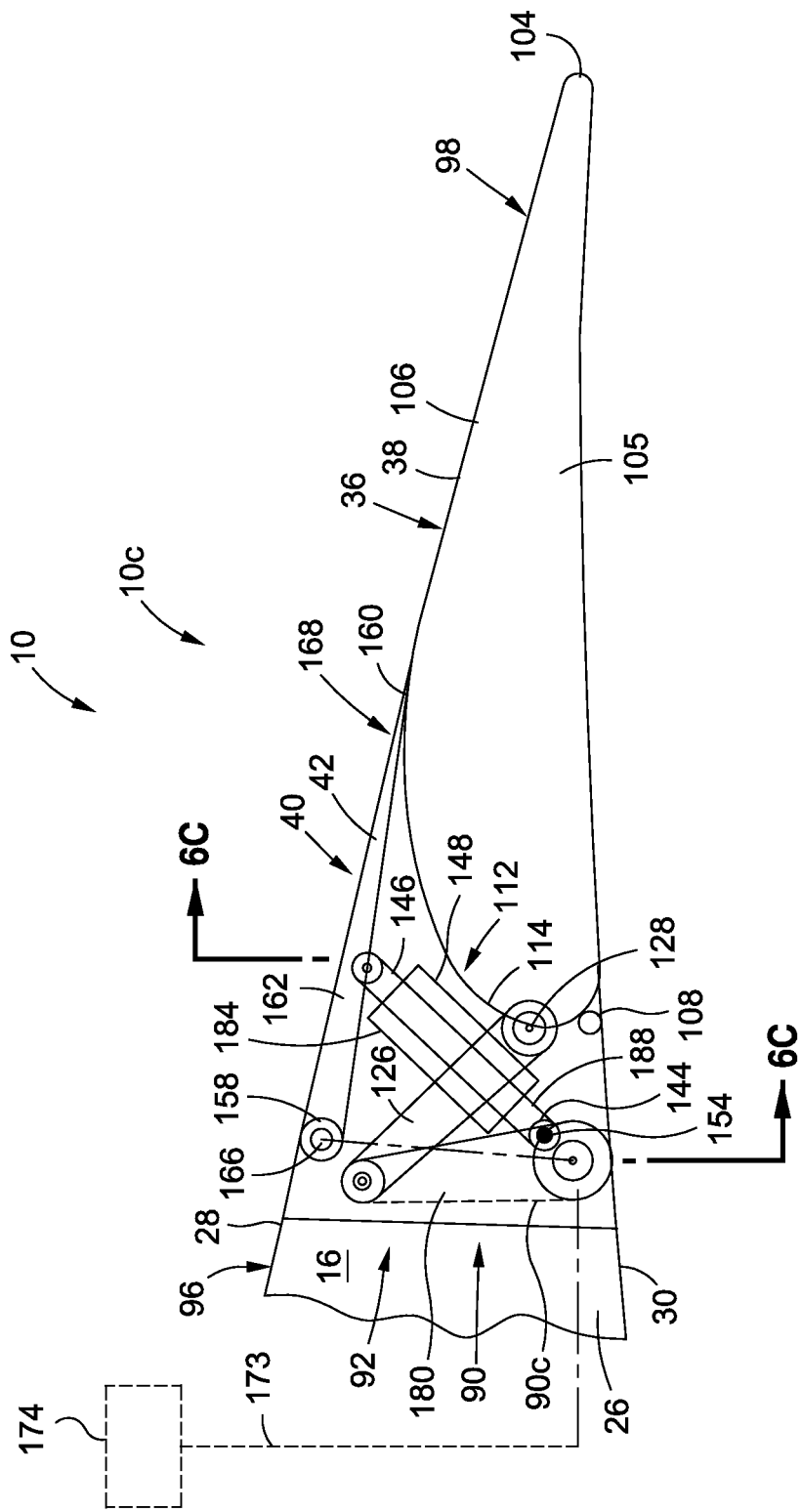
FIG. 6A is an illustration of a partial cross-sectional side view of yet another embodiment of a hinged panel operation system of the disclosure in a stowed position.
Figure 6B:
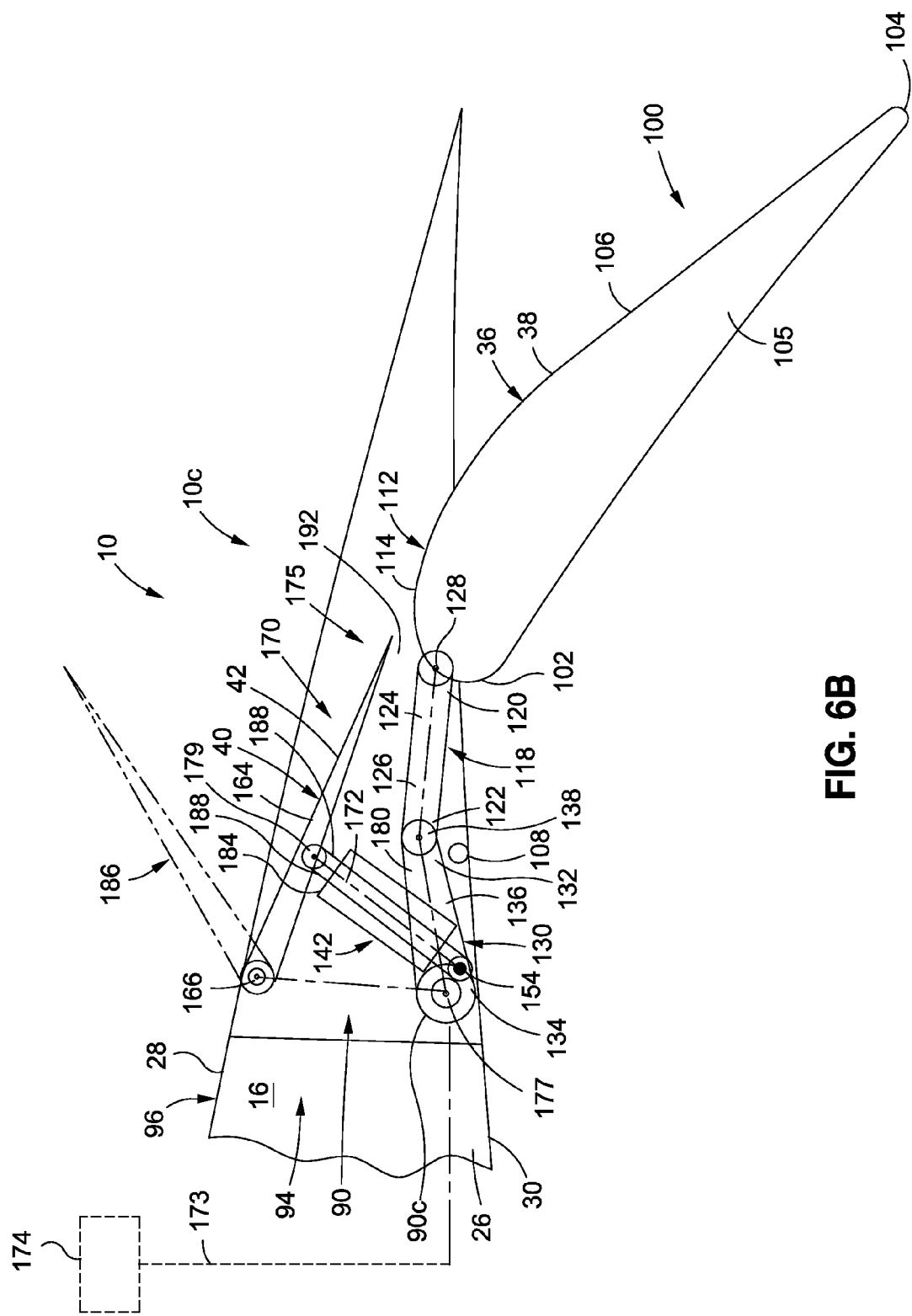
FIG. 6B is an illustration of a partial cross-sectional side view of the embodiment of the hinged panel operation system of FIG. 6A in a deployed position.

FIG. 6A is an illustration of a partial cross-sectional side view of yet another embodiment of a hinged panel operation system 10, in the form of hinged panel operation system 10c, of the disclosure. As shown in FIG. 6A, the hinged panel operation system 10c comprises a mechanical linkage assembly 90, such as in the form of mechanical linkage assembly 90c, shown in an assembly stowed position 92, such as during a cruise mode of the aircraft 12 (see FIG. 1). FIG. 6B is an illustration of a partial cross-sectional side view of the embodiment of the hinged panel operation system 10, such as in the form of the hinged panel operation system 10c of FIG. 6A. As shown in FIG. 6B, the mechanical linkage assembly 90, such as in the form of mechanical linkage assembly 90c, is shown in an assembly deployed position 94, such as during a landing mode of the aircraft 12 (see FIG. 1).

The embodiment of the hinged panel operation system 90, in the form of hinged panel operation system 90c, as shown in FIG. 6A, is similar to the embodiment shown in FIGS. 5A-5B, except that the third link 142 of the mechanical linkage assembly 90b (see FIG. 5B) of the embodiment shown in FIGS. 5A-5B is in the form of an actuator 184 (see FIG. 6A) with an actuator piston 188 (see FIG. 6A). Preferably, the hinged panel 40 is in the form of a spoiler 42. The actuator 184 is preferably configured to move the spoiler 42 between a stowed position 168 (see FIG. 6A) and a drooped position 170 (see FIG. 6B) or between the stowed position 168 (see FIG.

6A) and a raised position 186 (see FIG. 6B). The actuator 184 may comprise the actuator piston 188 (see FIG. 6B) or another suitable actuating device. The actuator 184 may replace the hinged panel bellcrank link 182 (see FIG. 5A) to allow for simplification of the spoiler 42 functionality.

Figure 6C:
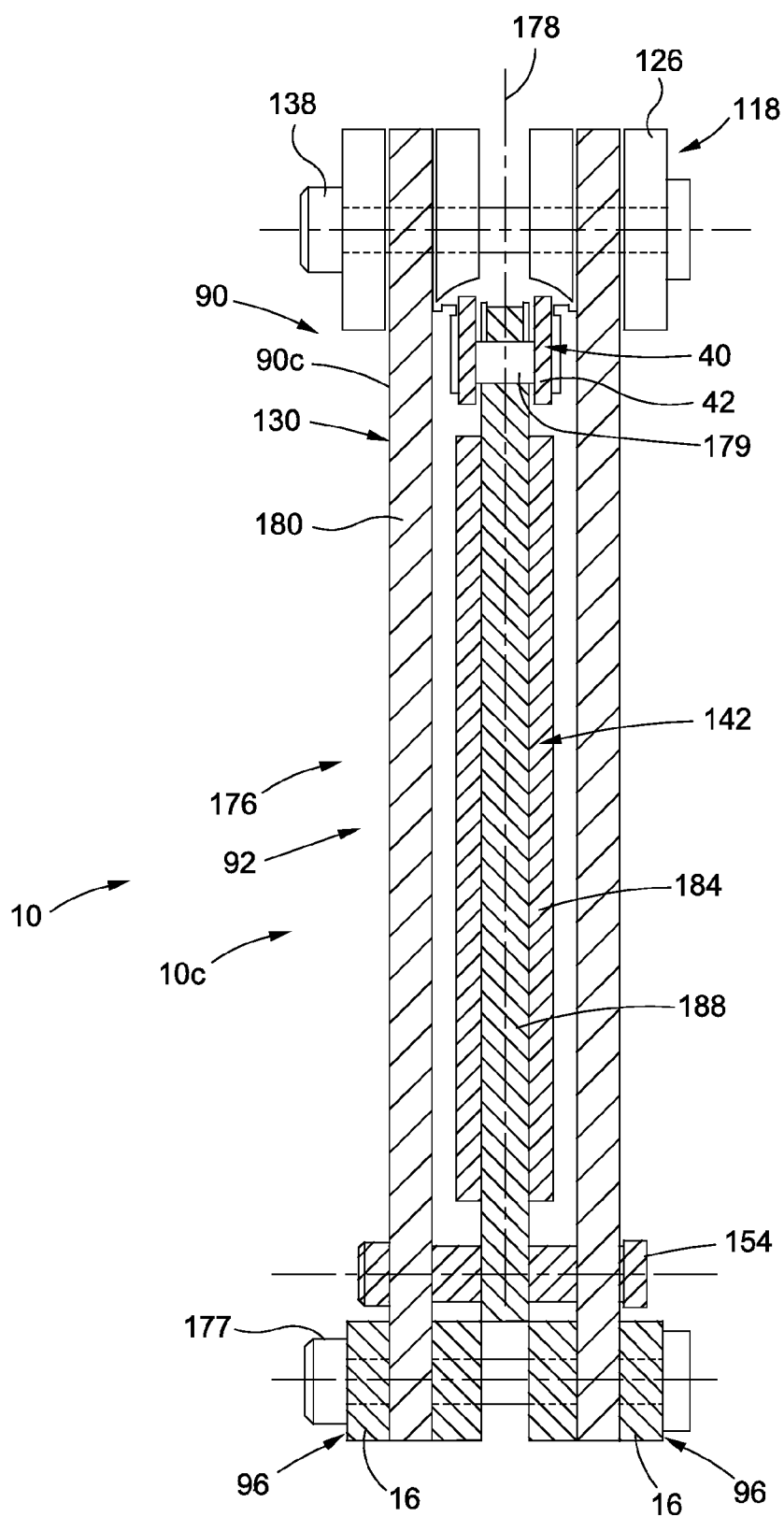
FIG. 6C is an illustration of a cross-sectional view taken along lines 6C-6C of FIG. 6A; and, FIG. 7 is an illustration of a flow diagram of an exemplary embodiment of a method of the disclosure.

FIG. 6C is an illustration of a cross-sectional view taken along lines 6C-6C of FIG. 6A. FIG. 6C shows a view looking from the rear of an aircraft forward when the mechanical linkage assembly 90, such as in the form of mechanical linkage assembly 90c, is in the assembly stowed position 92. As shown in FIG. 6C, the first link 118, the second link 130, the third link 142 in the form of the actuator 184, and the eccentric attachment 154 are preferably in an inline configuration 176 and centered about a third link centerline 178 of the third link 142 when the mechanical linkage assembly 90 is in the assembly stowed position 92. As further shown in FIG. 6C, in this embodiment, the eccentric attachment 154 is attached through the second link 130 and is attached through the actuator piston 188 of the actuator 184 and is proximate the fixed structure 96 instead of being attached through the hinged panel 40.

In another embodiment of the disclosure, there is provided an aircraft system 190 (see FIG. 1). As shown in FIG. 1, the aircraft system 190 comprises a wing 16 of an aircraft 12. As further shown in FIG. 1, the wing 16 has a wing body 26, a wing upper surface 28, and a trailing edge 24. As further shown in FIG. 1, the aircraft system 190 further comprises a flap 38 coupled to the trailing edge 24 and being movable relative to the wing 16 between a retracted position 98 (see FIG. 4A) and a deployed position 100 (see FIG. 4B). As further shown in FIG. 1, the aircraft system 190 further comprises a hinged panel operation system 10 coupled between the wing body 26 and the flap 38. The hinged panel operation system 10 comprises a mechanical linkage assembly 90 (see FIGS. 4A-6B). As shown in FIGS. 4A-6B, the mechanical linkage assembly 90 comprises a first link 118 operatively coupled to the flap 38, a second link 130 pivotably connected at a first end 132 to the first link 118 and pivotably connected at a second end 134 to a third link 142, and an eccentric attachment 154 connecting the second link 130 to the third link 142.

The hinged panel operation system 10 further comprises a hinged panel 40 (see FIG. 1) positioned forward of the flap 38 on a portion of the wing upper surface 26 and being operatively coupled to the mechanical linkage assembly 90. The hinged panel 40 is preferably movable by the mechanical linkage assembly 90 between a stowed position 168 (see FIG. 4A) and a drooped position 170 (see FIG. 4B). The mechanical linkage assembly 90 provides a load path 172 (see FIG. 4B) to the hinged panel 40. As shown in FIGS. 1 and 4A, the aircraft system 190 further comprises a control device 174 operatively coupled to the mechanical linkage assembly 90. The control device 174 is configured to control the mechanical linkage assembly 90 to move the hinged panel 40 to a selected position 175 (see FIG. 4A). Preferably, the control device 174 is preferably configured to control the mechanical linkage assembly 90 to move the hinged panel 40 to the stowed position 168 (see FIG. 4A) when the aircraft 12 (see FIG. 1) is in a cruise mode and to move the hinged panel 40 to the drooped position 170 (see FIG. 4B) when the aircraft 12 is in a takeoff mode or a landing mode. As shown in FIGS. 4C, 5C, 6C, the first link 118, the second link 130, the third link 142, and the eccentric attachment 154 are preferably in an inline configuration 176 and centered about a third link centerline 178 of the third link 142 when the mechanical linkage assembly 90 is in an assembly stowed position 92. In one embodiment as shown in FIGS. 6A-6C, the hinged panel 40 comprises a spoiler 42 and the third link 142 of the mechanical linkage assembly 90 comprises an actuator 184 configured to move the spoiler 42 between a stowed position 168 and a drooped position 170 or between the stowed position 168 and a raised position 186. As shown in FIG. 4B, the first link 118 preferably comprises a drive link member 126 having a drive link attachment point 128 on an outer flap contour 114 of the flap 38.

Figure 7:
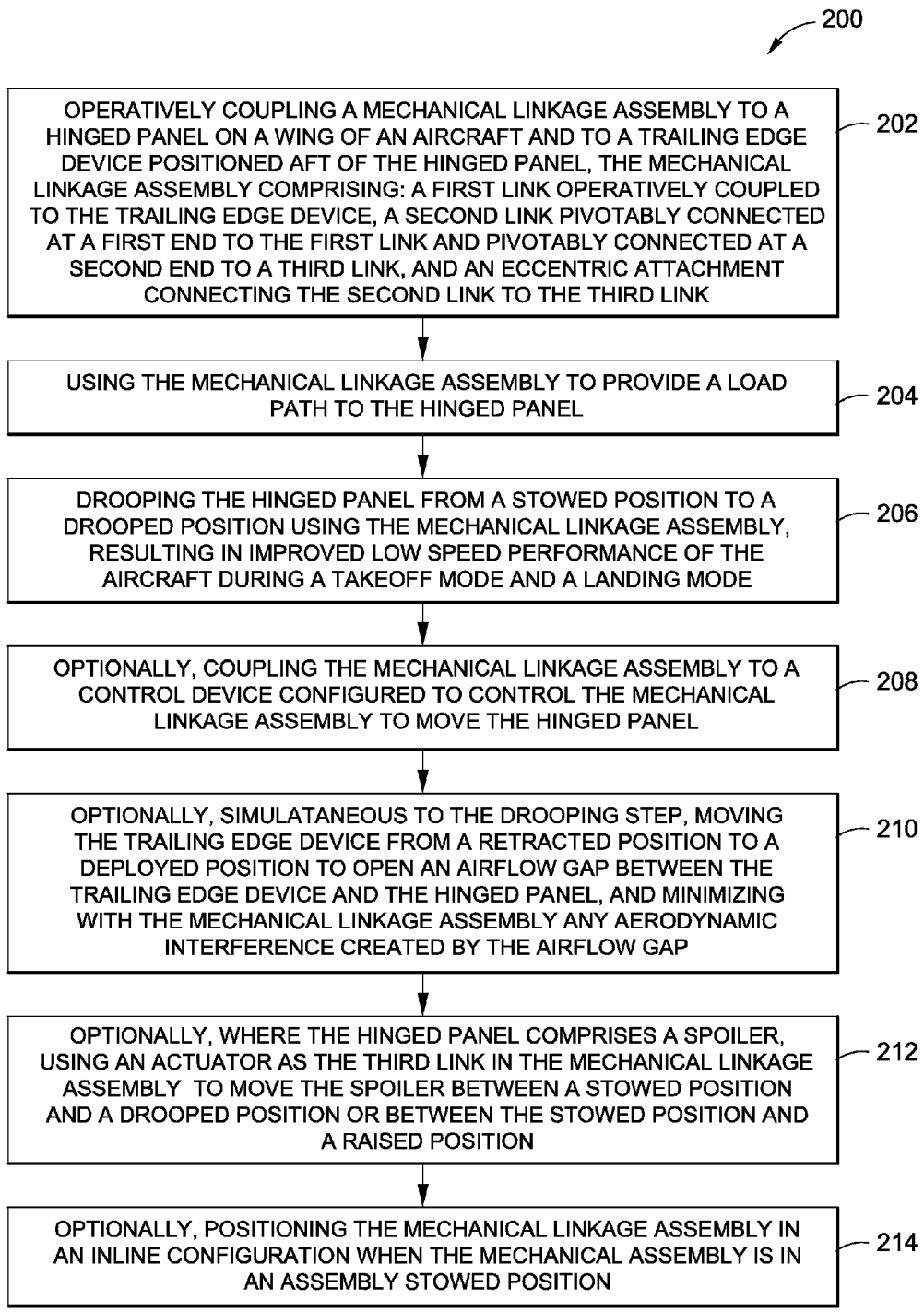

In another embodiment of the disclosure, there is provided method 200 for operating a hinged panel 40 (see FIG. 1) in an aircraft 12 (see FIG. 1). FIG. 7 is an illustration of a flow diagram of an exemplary embodiment of the method 200 of the disclosure. The method 200 comprises the step 202 of operatively coupling a mechanical linkage assembly 90 (see FIG. 4A) to a hinged panel 40 (see FIG. 4A) on the wing 16 (see FIG. 4A) of an aircraft 12 (see FIG. 1) and to a trailing edge device 36 (see FIG. 4A) positioned aft of the hinged panel 40. As shown in FIG. 4B, the mechanical linkage assembly 90 comprises a first link 118 operatively coupled to the trailing edge device 36. As further shown in FIG. 4B, the mechanical linkage assembly 90 further comprises a second link 130 pivotably connected at a first end 132 to the first link 118 and pivotably connected at a second end 134 to a third link 142. As further shown in FIG. 4B, the mechanical linkage assembly 90 further comprises an eccentric attachment 154 connecting the second link 130 to the third link 142. The step 202 of operatively coupling the mechanical linkage assembly 90 may further comprise operatively coupling the first link 118, comprising a drive link member 126 (see FIG. 4B) having a drive link attachment point 128 (see FIG. 4B), on an outer contour portion 112 (see FIG. 4B) of an inboard trailing edge device 36a (see FIG. 1).

As shown in FIG. 7, the method 200 further comprises the step 204 of using the mechanical linkage assembly 90 to provide a load path 172 (see FIG. 4B) to the hinged panel 40. As shown in FIG. 7, the method 200 further comprises the step 206 of drooping the hinged panel 40 from a stowed position 168 (see FIG. 4A) to a drooped position 170 (see FIG. 4B) using the mechanical linkage assembly 90. This may result in improved low speed performance of the aircraft 12 during a takeoff mode and a landing mode.

As shown in FIG. 7, the method 200 further optionally comprises the step 208 of operatively coupling the mechanical linkage assembly 90 to a control device 174 (see FIG. 4A) configured to control the mechanical linkage assembly 90 to move the hinged panel 40 to the stowed position 168 (see FIG. 4A) when the aircraft 12 is in a cruise mode and to move the hinged panel 40 to the drooped position 170 (see FIG. 4B) when the aircraft 12 is in the takeoff mode or the landing mode.

As shown in FIG. 7, the method 200 further optionally comprises simultaneous to the drooping step 206, the step 210 of moving the trailing edge device 36 from a retracted position 98 (see FIG. 4A) to a deployed position 100 (see FIG. 4B) to open an airflow gap 194 (see FIG. 4B) between the trailing edge device 38 and the hinged panel 40, and minimizing with the mechanical linkage assembly 90 any aerodynamic interference created by the airflow gap 194. As shown in FIG. 4B, in the deployed position 100, the airflow gap 194 is created between the trailing end 160 of the hinged panel 40, or spoiler 42, and the leading end 102 of the trailing edge device 36 or flap 38, allowing an airflow to flow through the airflow gap 194.

FIG. 4B shows the hinged panel operation system 10 with the flap 38 and the hinged panel 40 deployed to a high lift configuration. In this configuration, the mechanical linkage assembly 90 moves or pulls the hinged panel 40 downwardly 170 relative to the wing 16 to the drooped position and the flap 38 is also moved downwardly to a deployed position 100. The mechanical linkage assembly 90 moves the hinged panel 40 downwardly to the drooped position 170 (see FIG. 4B), so as to control the size of the airflow gap 192 (see FIG. 4B) between the trailing end 160 (see FIG. 4B) of the hinged panel 40 and the leading end 102 (see FIG. 4B) of the flap 38. In the drooped position 170 (see FIG. 4B), the hinged panel 40 may guide the flow of air passing over the wing upper surface 28 (see FIG. 4B) while the size of the airflow gap 192 regulates the amount of airflow from the wing lower surface 30 (see FIG. 4B) to the wing upper surface 28 so that the air remains attached to the wing surfaces as it flows over the flap 38. The airflow gap 192 may have a size and location selected to produce optimal or conditionally optimal air or fluid flow over the flap 38. To achieve the selected gap size, the control device 174 (see FIG. 4B) may direct the mechanical linkage assembly 90, and in turn, the hinged panel 40 or spoiler 42 to move in accordance with a predetermined movement that may be based on the position of the flap 38.

As shown in FIG. 7, where the hinged panel 40 comprises a spoiler 42, the step 202 of the method 200 of operatively coupling the mechanical linkage assembly 90 may further optionally comprise step 212 of using the actuator 184 (see FIG. 6B) as the third link 142 to move the spoiler 42 (see FIG. 6B) between a stowed position 168 (see FIG. 6A) and a drooped position 170 (see FIG. 6B) or between the stowed position 168 (see FIG. 6A) and a raised position 186 (see FIG. 6B).

As shown in FIG. 7, the step 202 of operatively coupling the mechanical linkage assembly 90 may further comprise step 214 of positioning the first link 118, the second link 130, the third link 142, and the eccentric attachment 154 in an inline configuration 176 (see FIGS. 4C, 5C, 6C) and centering the first link 118, the second link 130, the third link 142, and the eccentric attachment 154 about a third link centerline 178 (see FIGS. 4C, 5C, 6C) of the third link 142 when the mechanical linkage assembly 90 is in an assembly stowed position 92.

As will be appreciated by those of skill in the art, incorporating the novel hinged panel operation system 10 (see FIGS. 4A-6C) into the wing 16 (see FIG. 1) of an aircraft 12 (see FIG. 1) results in a number of substantial benefits. Disclosed embodiments of the hinged panel operation system 10 (see FIGS. 4A-6C) and method 200 (see FIG. 7) provide for a mechanical linkage assembly 90 to droop the hinged panel 40 or spoiler 42, that may be used with or without an actuator 184 and that works with a high hinge flap system instead of a known deep hinge flap system. Disclosed embodiments of the hinged panel operation system 10 (see FIGS. 4A-6C) and method 200 (see FIG. 7) provide for a system that is of a size and shape designed for use in a small space, such as within an aircraft wing of, for example, preferably less than one (1) foot below the wing upper surface 28 (see FIGS. 1, 4A), and more preferably, about 5-6 inches below the wing upper surface 28 (see FIGS. 1, 4A). Such compact geometry of disclosed embodiments of the hinged panel operation system 10 (see FIGS. 4A-6C) may decrease the weight and complexity of the system, and may result in decreased manufacturing and operation costs, as compared to known deep hinge flap systems with mechanical straight linkage systems that may span a significant distance, e.g., 6 feet below the wing surface.

The mechanical linkage assembly 90 is preferably constructed in an inline configuration 176 (see FIGS. 4C, 5C, 6C) and is preferably configured to accommodate a very long stroke input by the flap 38 (see FIG. 1) with minimal rotation of the hinged panel 40 and with a very short output bellcrank movement requirement. The ratio of the movement of the hinged panel 40 or spoiler 42 is very small as compared to the ratio of the movement of the flap 38. The embodiment shown in FIGS. 5A-5C, using a hinged panel bellcrank link 182 (see FIG. 5A), which is reversed from the embodiment shown in FIGS. 4A-4C using the crank shaft link 140 (see FIG. 4B), may handle the same motion but may also accommodate an actuator 184 (see FIG. 6B) instead of the hinged panel bellcrank link 182 (see FIG. 5A). This may allow for a combination, if desired, of a spoiler 42 (see FIG. 6B) and the use of the actuator 184 (see FIG. 6B) as the third link 142 to move the spoiler 42 (see FIG. 6B) between a stowed position 168 (see FIG. 6A) and a drooped position 170 (see FIG. 6B) or between the stowed position 168 (see FIG. 6A) and a raised position 186 (see FIG. 6B).

Moreover, disclosed embodiments of the hinged panels 40 or spoilers 42 having a drooping only functionality may allow for unobstructed aircraft slide escape paths in order to meet aircraft evacuation slide requirements. Further, disclosed embodiments of the hinged panels 40 or spoilers 42 preferably do not require the use of additional electro-mechanical actuators to meet aircraft roll capability requirements. This may decrease system complexity and weight, and may result in decreased installation and maintenance costs.

In addition, disclosed embodiments of the hinged panel operation system 10 (see FIGS. 4A-6C) and method 200 (see FIG. 7) provide for a mechanical linkage assembly 90 that provides a stiff load path 172 (see FIG. 4B) for the upper moving hinged panel 40 or spoiler 42 without providing a usual bellcrank attachment point, which may result in weight savings, as less parts are required. For example, the mechanical linkage assembly 90, such as the loading link 152 (see FIG. 4B) in one embodiment and the support link 180 (see FIG. 5A) in another embodiment, may be integrated into the fixed structure 96 (see FIGS. 4B, 5A), which reduces the number of parts typically required for a bellcrank mechanism, which may result in weight saving, and in turn, may result in reduced fuel consumption and reduced fuel costs.

Further, disclosed embodiments of the hinged panel operation system 10 (see FIGS. 4A-6C) and method 200 (see FIG. 7) provide a substantial mechanical advantage to the first link 118, such as in the form of the drive link member 126 (see FIG. 4B), which may be designed or made in a small size and shape to minimize aerodynamic slot interference, such as airflow through the airflow gap 192 (see FIG. 4B). For example, embodiments of the hinged panel operation system 10 (see FIGS. 4A-6C) preferably control the airflow gap 192 (see FIG. 4B) between the hinged panel 40 or spoiler 42 and the flap 38. By controlling the airflow gap 192, the load path 172 may be controlled and the low speed performance of the aircraft 12 (see FIG. 1) may be controlled, such as takeoff and landing performance. Disclosed embodiments of the hinged panel operation system 10 (see FIGS. 4A-6C) and method 200 (see FIG. 7) thus allow for drooped functionality of the hinged panel 40 or spoiler 42 for low speed performance of the aircraft 12, such as takeoff and landing performance.

In addition, the drive link attachment point 128 (see FIG. 4B) is preferably positioned on the outside of the outer flap contour 114 (see FIG. 4B) of the flap 38 and thus does not interfere in the flap structure design. Further, embodiments of the hinged panel operation system 10 (see FIGS. 4A-6C) may be applicable to and incorporated into both the inboard region of inboard panels on the wing 16 and the inboard region of outboard panels on the wing 16 (see FIG. 1).

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A hinged panel operation system comprising:
a mechanical linkage assembly coupled between a fixed structure and a trailing edge device, the mechanical linkage assembly comprising a first link operatively coupled to the trailing edge device, a second link pivotably connected at a first end to the first link and pivotably connected at a second end to a third link, and an eccentric attachment connecting the second link to the third link; and,
a hinged panel positioned forward of the trailing edge device and being operatively coupled to the mechanical linkage assembly, the hinged panel having a leading end connected to the fixed structure via an attachment element that is separate from the mechanical linkage assembly, the hinged panel being movable by the mechanical linkage assembly between a stowed position and a drooped position, and the mechanical linkage assembly providing a load path to the hinged panel.

2. The system of claim 1 wherein the mechanical linkage assembly is operatively coupled to a control device configured to control the mechanical linkage assembly to move the hinged panel to a selected position.

3. The system of claim 2 wherein the fixed structure is a wing of an aircraft and the control device is configured to control the mechanical linkage assembly to move the hinged panel to the stowed position when the aircraft is in a cruise mode and to move the hinged panel to the drooped position when the aircraft is in a takeoff mode or a landing mode.

4. The system of claim 1 wherein the trailing edge device comprises a flap movable by the mechanical linkage assembly between a retracted position and a deployed position.

5. The system of claim 1 wherein the first link, the second link, the third link, and the eccentric attachment are in an inline configuration and centered about a third link centerline when the mechanical linkage assembly is in an assembly stowed position.

6. The system of claim 1 wherein the first link comprises a drive link member having a drive link attachment point on an outer contour portion of the trailing edge device.

7. The system of claim 1 wherein the hinged panel comprises a spoiler and the third link of the mechanical linkage assembly comprises an actuator configured to move the spoiler between a stowed position and a drooped position or between the stowed position and a raised position.

8. The system of claim 1 wherein the hinged panel is an inboard hinged panel and the trailing edge device is an inboard trailing edge device.

9. The system of claim 1 wherein the eccentric attachment is attached to the hinged panel.

10. An aircraft system comprising:
a wing of an aircraft, the wing having a wing body, a wing upper surface, and a trailing edge;
a flap coupled to the trailing edge and being movable relative to the wing between a retracted position and a deployed position;
a hinged panel operation system coupled between the wing body and the flap, the hinged panel operation system comprising:
a mechanical linkage assembly comprising a first link operatively coupled to the flap, a second link pivotably connected at a first end to the first link and pivotably connected at a second end to a third link, and an eccentric attachment connecting the second link to the third link; and, a hinged panel positioned forward of the flap on a portion of the wing upper surface and being operatively coupled to the mechanical linkage assembly, the hinged panel having a leading end connected to the wing via an attachment element that is separate from the mechanical linkage assembly, the hinged panel being movable by the mechanical linkage assembly between a stowed position and a drooped position, and the mechanical linkage assembly providing a load path to the hinged panel; and, a control device operatively coupled to the mechanical linkage assembly, the control device configured to control the mechanical linkage assembly to move the hinged panel to a selected position.

11. The system of claim 10 wherein the control device is configured to control the mechanical linkage assembly to move the hinged panel to the stowed position when the aircraft is in a cruise mode and to move the hinged panel to the drooped position when the aircraft is in a takeoff mode or a landing mode.

12. The system of claim 10 wherein the first link, the second link, the third link, and the eccentric attachment are in an inline configuration and centered about a third link centerline when the mechanical linkage assembly is in an assembly stowed position.

13. The system of claim 10 wherein the hinged panel comprises a spoiler and the third link of the mechanical linkage assembly comprises an actuator configured to move the spoiler between a stowed position and a drooped position or between the stowed position and a raised position.

14. The system of claim 10 wherein the first link comprises a drive link member having a drive link attachment point on an outer flap contour of the flap.

15. A method for operating a hinged panel in an aircraft, the method comprising the steps of:

operatively coupling a mechanical linkage assembly to a hinged panel on a wing of an aircraft and to a trailing edge device positioned aft of the hinged panel, the hinged panel having a leading end connected to the wing via an attachment element that is separate from the mechanical linkage assembly, the mechanical linkage assembly comprising:

a first link operatively coupled to the trailing edge device;

a second link pivotably connected at a first end to the first link and pivotably connected at a second end to a third link; and, an eccentric attachment connecting the second link to the third link;

using the mechanical linkage assembly to provide a load path to the hinged panel; and, drooping the hinged panel from a stowed position to a drooped position using the mechanical linkage assembly, resulting in improved low speed performance of the aircraft during a takeoff mode and a landing mode.

16. The method of claim 15 further comprising operatively coupling the mechanical linkage assembly to a control device configured to control the mechanical linkage assembly to move the hinged panel to the stowed position when the aircraft is in a cruise mode and to move the hinged panel to the drooped position when the aircraft is in the takeoff mode or the landing mode.

17. The method of claim 15 further comprising simultaneous to the drooping step, the step of moving the trailing edge device from a retracted position to a deployed position to open an airflow gap between the trailing edge device and the hinged panel, and minimizing with the mechanical linkage assembly any aerodynamic interference created by the airflow gap.

18. The method of claim 15 wherein the hinged panel comprises a spoiler and the step of operatively coupling the mechanical linkage assembly to the hinged panel comprises using an actuator as the third link to move the spoiler between a stowed position and a drooped position or between the stowed position and a raised position.

19. The method of claim 15 wherein the step of operatively coupling the mechanical linkage assembly to the hinged panel step comprises positioning the first link, the second link, the third link, and the eccentric attachment in an inline configuration and centering about a third link centerline when the mechanical linkage assembly is in an assembly stowed position.

20. The method of claim 15 wherein the step of operatively coupling the mechanical linkage assembly to the hinged panel comprises operatively coupling the first link, comprising a drive link member having a drive link attachment point, on an outer contour portion of an inboard trailing edge device.

* * * * *